United States Patent
Sage, Jr.

(10) Patent No.: US 7,188,583 B2
(45) Date of Patent: Mar. 13, 2007

(54) LITTER BOX

(76) Inventor: James R. Sage, Jr., 10895 Route 59, Cyclone, PA (US) 16726

( * ) Notice: Subject to any disclaimer, the term of this patent is extended or adjusted under 35 U.S.C. 154(b) by 149 days.

(21) Appl. No.: 11/037,571

(22) Filed: Jan. 15, 2005

(65) Prior Publication Data

US 2006/0156994 A1 Jul. 20, 2006

(51) Int. Cl.
*A01K 29/00* (2006.01)
(52) U.S. Cl. ........................ 119/166; 119/165
(58) Field of Classification Search ............... 119/166, 119/165; 209/659, 660, 675
See application file for complete search history.

(56) References Cited

U.S. PATENT DOCUMENTS 5,785,000 A * 7/1998 Barbary ................ 119/166
2003/0188691 A1 * 10/2003 Sage, Jr. .................. 119/166
2005/0115510 A1 * 6/2005 D'Anielo .................. 119/166
2005/0183672 A1 * 8/2005 Lewis ...................... 119/165

* cited by examiner

*Primary Examiner*—Teri Pham Luu
*Assistant Examiner*—Elizabeth Shaw
(74) *Attorney, Agent, or Firm*—Ansel M. Schwartz

(57) ABSTRACT

A cat litter box includes a first litter box half with a first recess and a first lip. The litter box includes a second litter box half with a second recess and a second lip which engages with the first litter box half to create an enclosure. The first recess and the second recess align to form an entrance to the enclosure through the which the cat can enter or exit the enclosure. Each recess sloped to act as a pour spout. Each half has a sliding gate that moves up and down over the recess. The gate in a down and stored position while in use for the cat and in an up position for sifting the litter. A method for cleaning a cat litter box.

9 Claims, 8 Drawing Sheets

PET OWNER
LIFTS HALF WITH
DIRTY LIFTER.

WITH THE SIFTER
IN THE UP POSITION.

PET OWNER SIFTS
CLEANS LITTER INTO
EMPTY HALF.

THE CLUMPS AND SOLID
PET WASTE IS TRAPPED
ONLY ALLOWING CLEAN LITTER TO
PASS THRU THE SIFTER GATE.

THE OWNER THE DUMPS
THE REMAINING CLUMPS
AND SOLID WASTE INTO THE TRASH.

LAST STEP IS TO REPLACE
THE NOW EMPTY HALF
TO BECOME THE LITTER BOX TOP.

LITTER BOX

FIELD OF THE INVENTION

The present invention is related to a cat litter box. More specifically, the present invention is related to a cat litter box that has a first litter box half with a first recess and a second litter box half with a second recess that together form an enclosure, with the first recess and second recess aligned to define an entrance for the cat to enter or exit the enclosure.

BACKGROUND OF THE INVENTION

Many millions of cat owners face the daily or weekly task of litter box maintenance. An unpleasant task at best, many cat owners put off cleaning the litter box as long as possible. The current invention is designed to make this task as quick and easy as possible. Another benefit is that the pet owner is less likely to come in contact with the litter waste because of the pouring/sifting action.

SUMMARY OF THE INVENTION

The present invention pertains to a cat litter box. The litter box comprises a first litter box half with a first recess and a first lip. The litter box comprises a second litter box half with a second recess and a second lip which engages with the first litter box half to create an enclosure. The first recess and the second recess align to form an entrance to the enclosure through the which the cat can enter or exit the enclosure. Each recess sloped to act as a pour spout. Each half has a sliding gate that moves up and down over the recess. The gate in a down and stored position while in use for the cat and in an up position for sifting the litter.

The present invention pertains to a method for cleaning a cat litter box. The method comprises the steps of separating a first litter box half having a first recess and a gate from a second litter box half having a second recess and a gate. There is the step of moving the gate and the second litter box half over the second recess lifting the second litter box half over the first litter box half. There is the step of tilting the second litter box half so litter is sifted through a sifter of the gate of the second litter box half and falls into the-first litter box half with soiled litter held back by the sifter from falling into the first litter box half. There is the step of moving the gate on the second box half down and away from the second recess. There is the step of placing the second litter box half on the first litter box half to create an enclosure, with the first recess and second recess aligned to form an entrance to the enclosure for the cat to enter and exit the enclosure.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
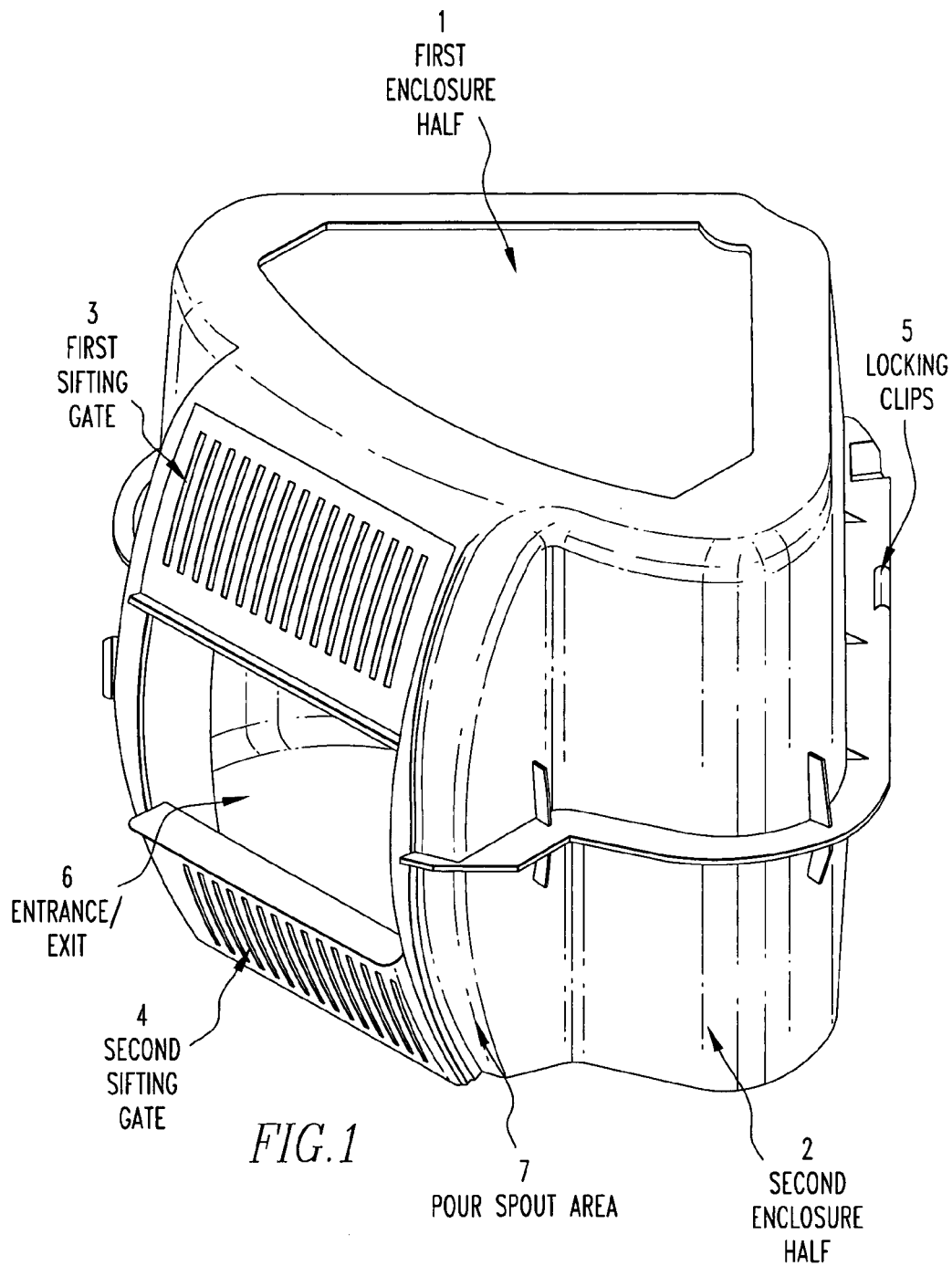
FIG. 1 is a perspective view of a cat litter box of the present invention.
Figure 2:
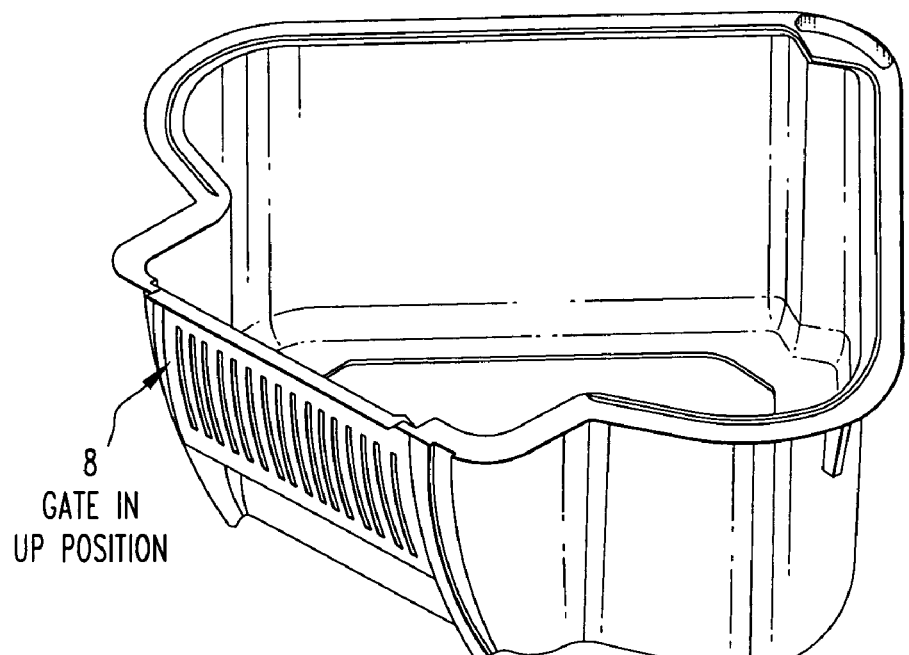
FIG. 2 is a perspective view of a first litter box half of the cat litter box.
Figure 3:
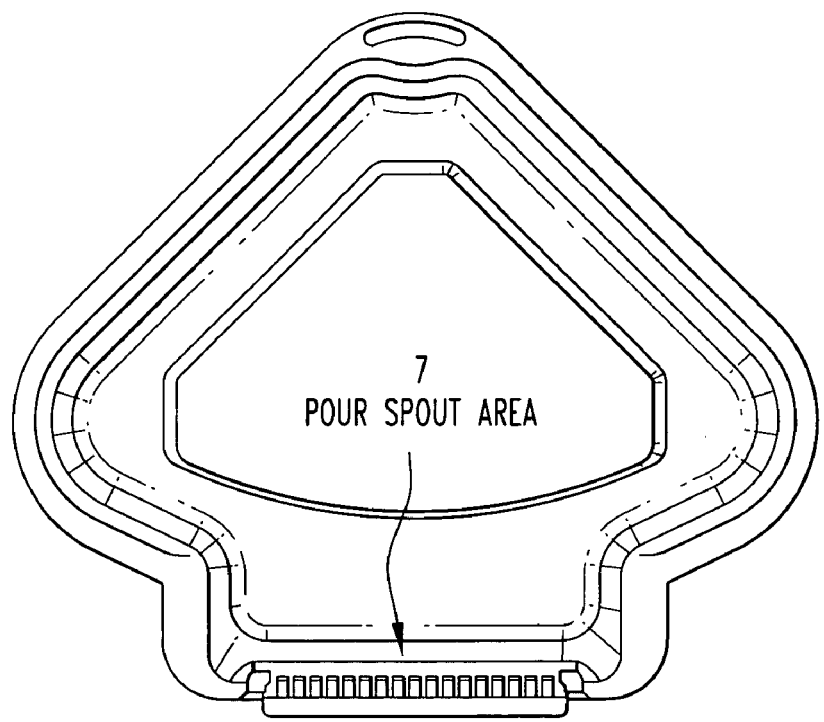
FIG. 3 is an overhead view of the first litter box half.
Figure 2A:
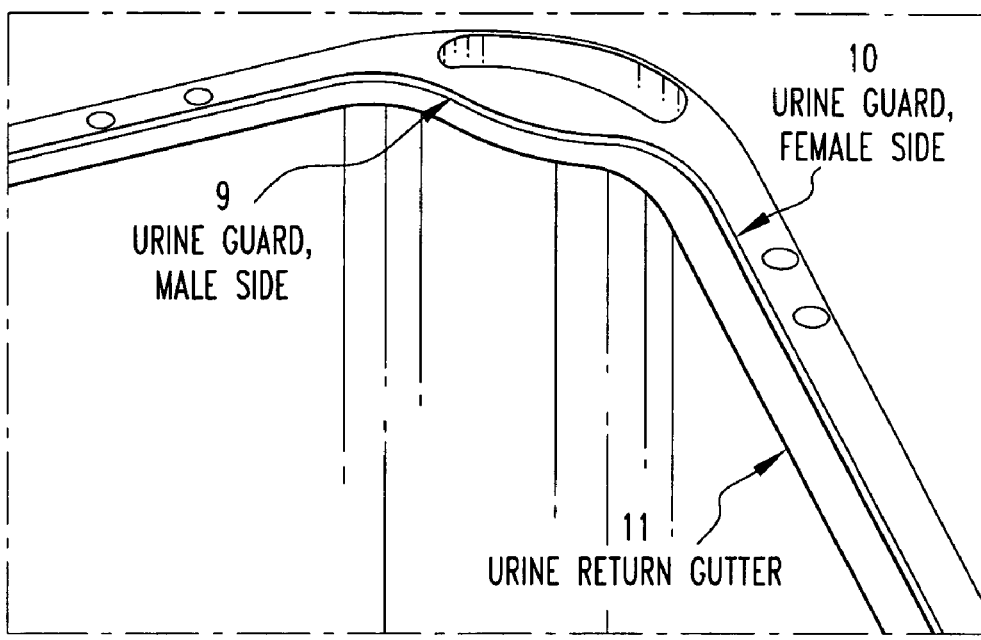
FIG. 2a is a perspective view of a portion of the first litter box half.
Figure 2B:
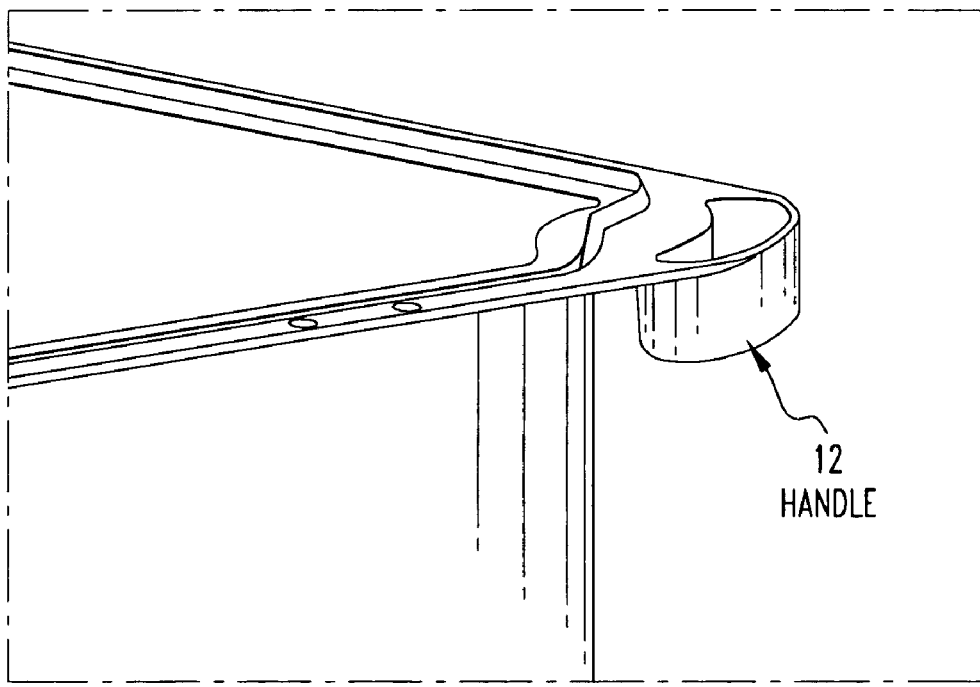
FIG. 2b is a perspective view of a portion of the first litter box half showing a handle.
Figure 4:
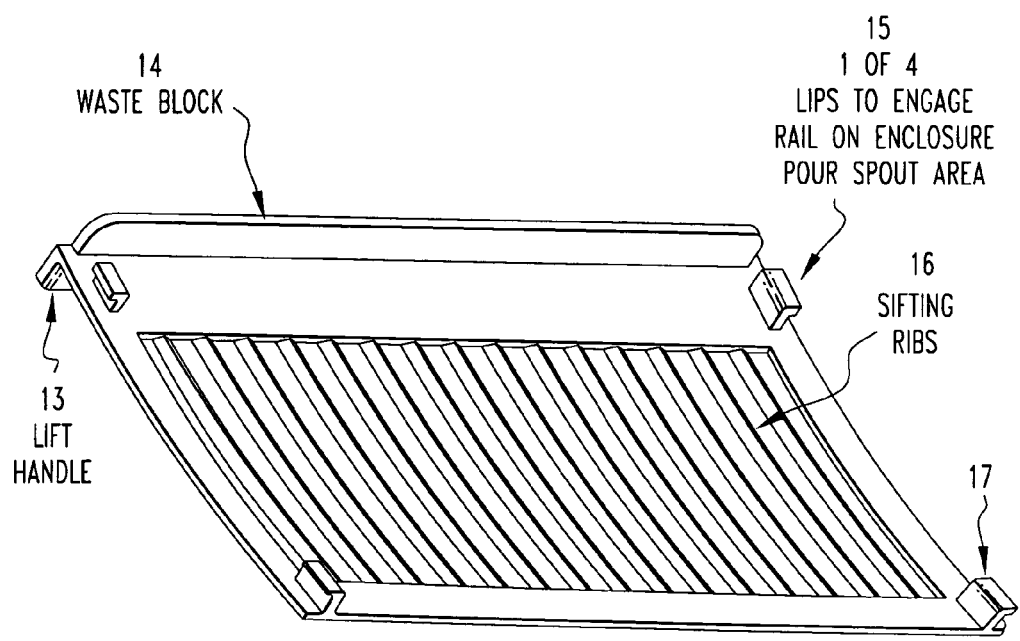
FIG. 4 is a perspective view of a gate.

Referring now to the drawings wherein like reference numerals refer to similar or identical parts throughout the several views, and more specifically to FIGS. 1–5 thereof, there is shown a cat litter box. The litter box comprises a first litter box half with a first recess and a first lip. The litter box comprises a second litter box half with a second recess and a second lip which engages with the first litter box half to create an enclosure 1. The first recess and the second recess align to form an entrance to the enclosure 1 through the which the cat can enter or exit the enclosure 1. Each recess sloped to act as a pour spout. Each half has a sliding gate 8 that moves up and down over the recess. The gate 8 in a down and stored position while in use for the cat and in an up position for sifting the litter.

Preferably, each half has a slot, and each gate 8 has a clip which engages with the slot to lock the gate 8 in either the down or up position. Each half preferably has a back corner with a handle 12 that extends from the back corner. Preferably, each gate 8 has a lip handle 12 for moving the gate 8 up and down. Each half preferably has a generally triangular shape.

Preferably, the first lip and the second lip each have the same shape which conforms to create a seal where the first lip and the second lip meet. The litter box preferably includes locking clips which engage the first and second lips to hold the first and second halves together. Preferably, the first and second lips have urine guards 9, 10.

The present invention pertains to a method for cleaning a cat litter box. The method comprises the steps of separating a first litter box half having a first recess and a gate 8 from a second litter box half having a second recess and a gate 8. There is the step of moving the gate 8 and the second litter box half over the second recess lifting the second litter box half over the first litter box half. There is the step of tilting the second litter box half so litter is sifted through a sifter gate 8 of the second litter box half and falls into the first litter box half with soiled litter held back by the sifter from falling into the first litter box half. There is the step of moving the gate 8 on the second box half down and away from the second recess. There is the step of placing the second litter box half on the first litter box half to create an enclosure 1, with the first recess and second recess aligned to form an entrance to the enclosure 1 for the cat to enter and exit the enclosure 1.

In the operation of the invention, the cat litter box comprises a first litter box half with a first recess and a second litter box half with a second recess, as shown in FIG. 1. The first litter box half engages with the second litter box half to create an enclosure 2. The first recess aligns with the second recess to form an entrance to the enclosure 2 through which the animal can enter/exit. This entrance is sloped to act as a pour spout during the sifting process.

Figure 5:
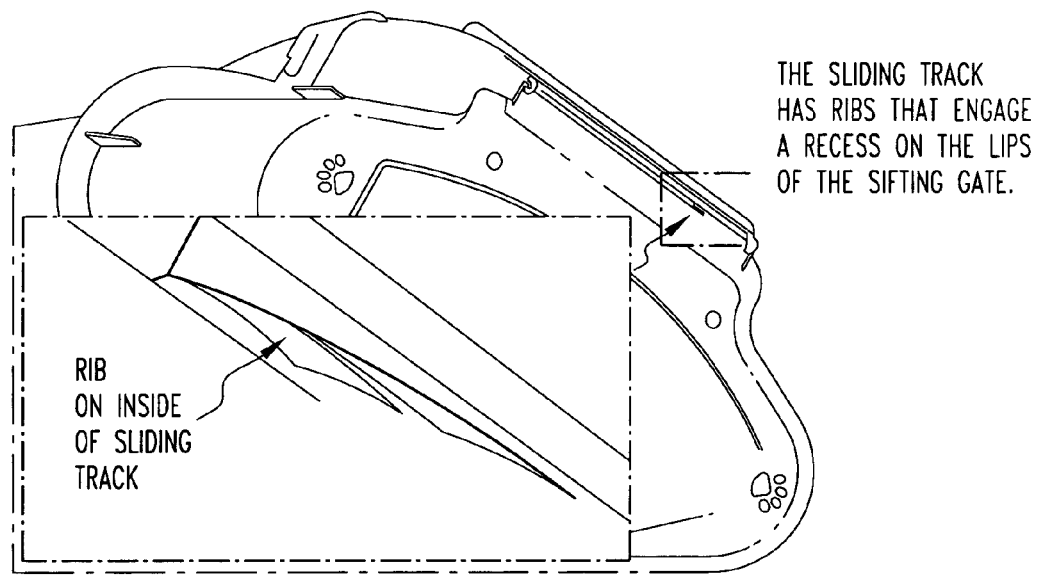
FIG. 5 is a detached view of a slot area which engages with a lip on the gate.
Figure 6:
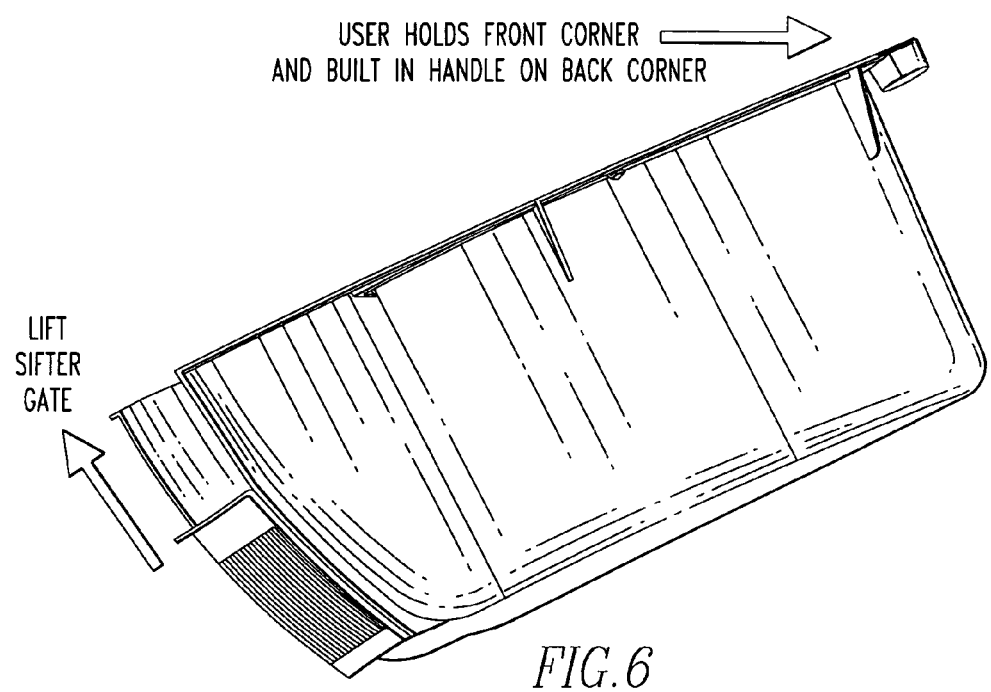
FIG. 6 is a perspective view of the first litter box half.
Figure 7:
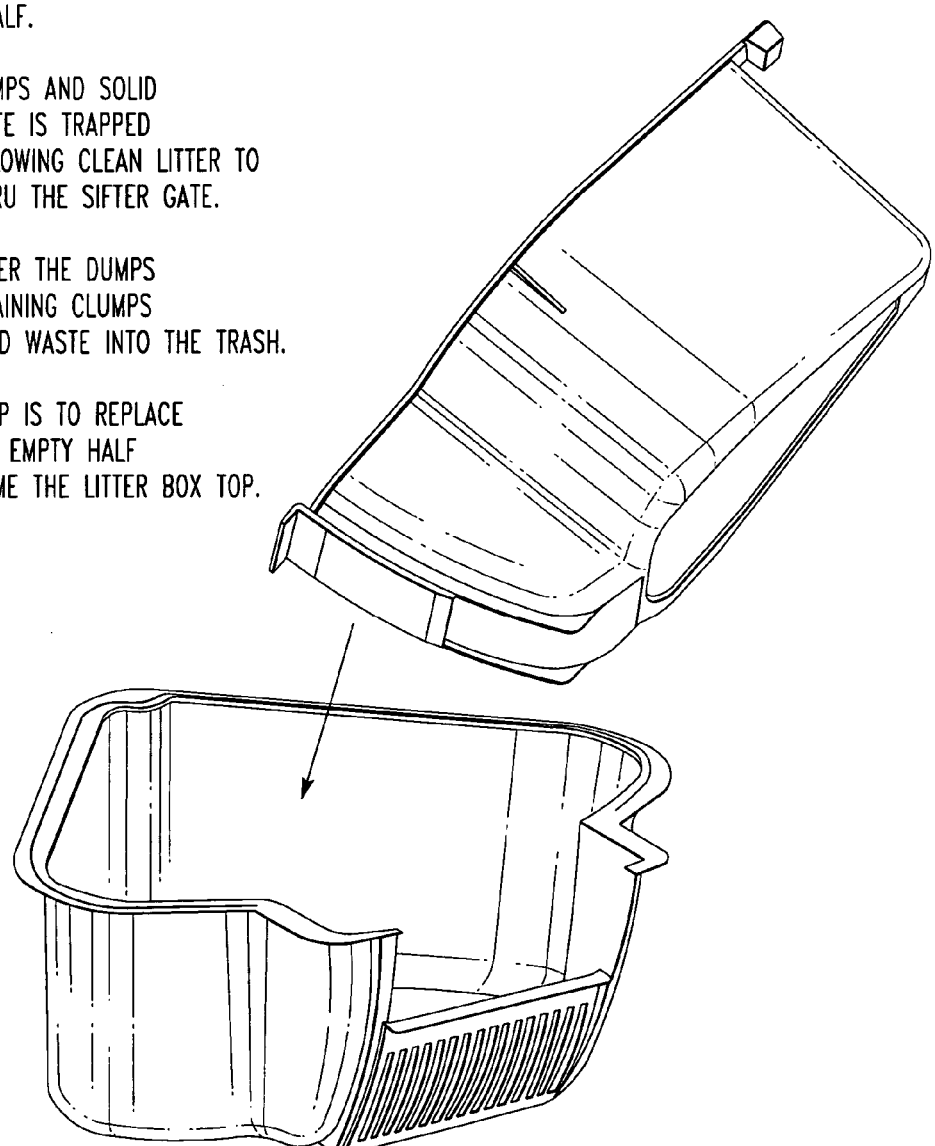
FIG. 7 is a perspective view of the first and second litter box halves.
Figure 8:
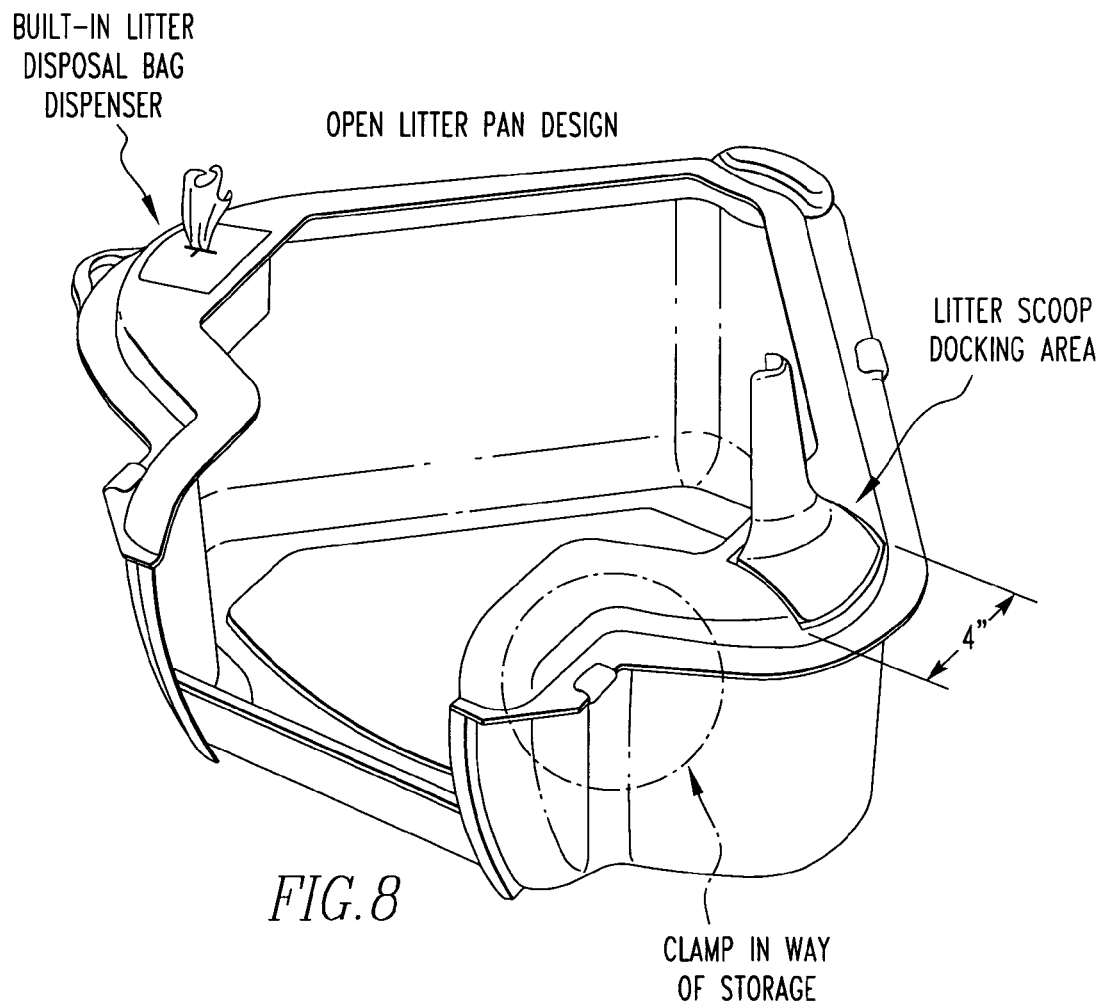
FIG. 8 is a perspective view of an alternative embodiment of a first litter box half, where the second litter box half (not shown) would be identical to the first.

Each half has a sliding sifting gate 8 that moves up and down along the exterior of the entrance. This gate 8 is in the down and stowed position while in use for the cat. The gate 8 is lifted via the lip handle 12 when it is time to clean the litter box. The gate 8 locks in the up or down position via a slot area engaging with a lip, as shown in FIG. 5. Each half has a built-in-handle 12 in the back corner of the triangle shape to help with the pour process. The triangle shape fits nicely in a corner of the room and saves space in the room. To clean the cat litter box, after the cat uses the litter box, the first half is removed and set on the floor with the open side of the enclosure 1 facing up. The next step is for the pet owner to place his fingers on the lip of the gate 8 on the second half and lift it to the up position. Next, the cat owner lifts the second half with soiled litter using the handle 12 and the front corner of the second litter box half.

The pet owner pours the litter into the first half of the enclosure 1 as he pours the litter through the front pour spout and through the ribs 16 of the sifter. This allows the clean litter to pass through the rib openings and traps the clumps and solid waste inside the second litter box half. The next step is to lower the gate 8 on the second litter box half and pour the pet waste into a trash container. There is a lip facing in toward the inside of the litter box which keeps litter waste from falling out during the pour process. This lip may also make it difficult to dump the waste into the trash. To dump the waste easily, use one of the two front corners to dispose of the waste. Next, there is the step of engaging the now empty second litter box half with the first half that now has clean litter to create an enclosure 1 again.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A cat litter box comprising:
   a first litter box half with a first recess and a first lip; and
   a second litter box half with a second recess and a second lip which engages with the first litter box half to create an enclosure, the first recess and the second recess align to form an entrance to the enclosure through which the cat can enter or exit the enclosure, each recess sloped to act as a pour spout, each half has a sliding gate that moves up and down over the recess, the gate in a down and stored position while in use for the cat and in an up position for sifting the litter.

2. A litter box as described in claim 1 wherein each half has a slot, and each gate has a clip which engages with the slot to lock the gate in either the down or up position.

3. A litter box as described in claim 2 wherein each half has a back corner with a handle that extends from the back corner.

4. A litter box as described in claim 3 wherein each gate has a lip handle for moving the gate up and down.

5. A litter box as described in claim 4 wherein each half has an a generally triangular shape.

6. A litter box as described in claim 5 wherein the first lip and the second lip each have the same shape which conforms to create a seal where the first lip and the second lip meet.

7. A litter box as described in claim 6 including locking clips which engage the first and second lips to hold the first and second halves together.

8. A litter box as described in claim 7 wherein the first and second lips have urine guards.

9. A method for cleaning a cat litter box comprising the steps of:
   separating a first litter box half having a first recess and a first gate from a second litter box half having a second recess and a second gate;
   moving the second gate and the second litter box half over the second recess;
   lifting the second litter box half over the first litter box half;
   tilting the second litter box half so litter is sifted through a sifter of the gate of the second litter box half and falls into the first litter box half with soiled litter held back by the sifter from falling into the first litter box half;
   moving the gate on the second box half down and away from the second recess; and
   placing the second litter box half on the first litter box half to create an enclosure, with the first recess and second recess aligned to form an entrance to the enclosure for the cat to enter and exit the enclosure.

* * * * *